ROWELL & BRIGGS.
Carriage-Spring.
No. 52,889. Patented Feb. 27, 1866.
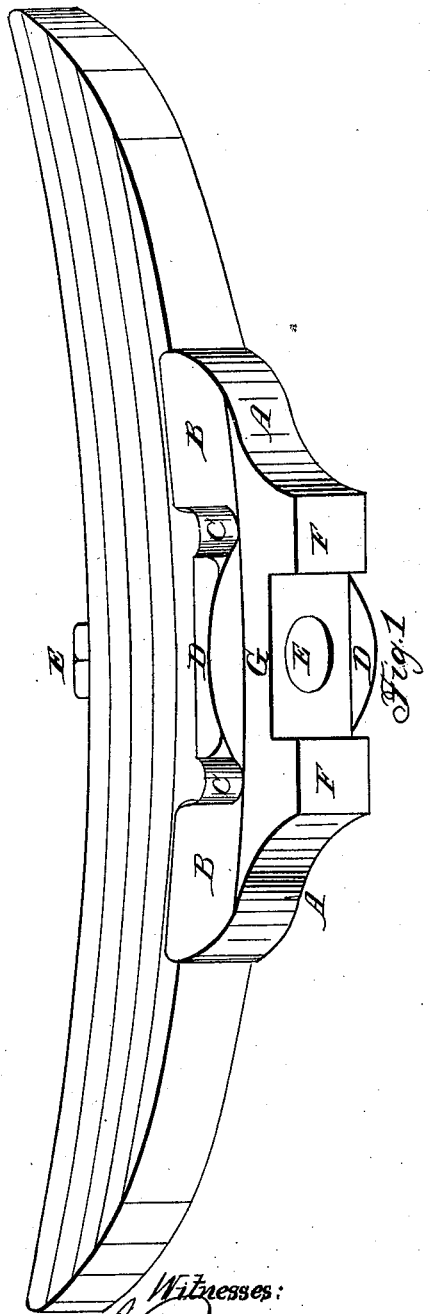
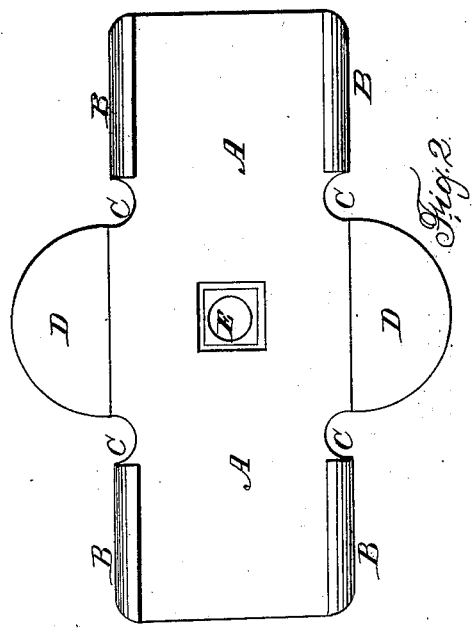

United States Patent Office.

RUFUS ROWELL AND FRANCIS H. BRIGGS, OF BOSTON, MASS.

IMPROVEMENT IN DEVICE FOR HOLDING CARRIAGE-SPRINGS.

Specification forming part of Letters Patent No. 52,889, dated February 27, 1866.

*To all whom it may concern:*

Be it known that we, RUFUS ROWELL and FRANCIS H. BRIGGS, of Boston, county of Suffolk, and State of Massachusetts, have invented a new and Improved Mode in a Spring-Seat for the purpose of holding in their place springs of pleasure-carriages and all other vehicles where springs are used; and we do hereby declare that the following is a full and exact description thereof, reference being had to the accompanying drawings and letters of reference marked thereon, in which—

Figure 1 is a perspective view, showing all its parts, to be made of malleable iron or any other suitable material; Fig. 2, a plan or transverse section.

Figures 3 3 and letters A A is the body of our invention, which was invented by one of your petitioners, Rufus Rowell, some twenty-five years past, and has been used by others.

Figures 1 and 2 and letters B B B B are four flanges on the upper sides of body A A, one of the improvements now pending by your petitioners.

The first object of our invention is to keep the springs in the seat and prevent them from swinging or twisting out of place, which would cause the wear of the axle by the action of the carriage. For that purpose your petitioners have invented and applied the four flanges, B B B B, placed on the upper side or edges of the spring-seat sufficiently high to keep the spring in place, as above named.

The second improvement is the four grooves, C C C C, in the sides of the spring-seat, to hold and guide the straps that pass around the spring, seat, and axle of the carriage, keeping them in place.

The third improvement is the bolt, from E to E, that passes through the body of the seat and the spring, bolting them firmly together, preventing the spring or either of the leaves from slipping endwise.

F F are two flanges, fitting over either side of the axle, to prevent the seat from slipping endwise on the axle.

Letter G, Fig. 1, is a space under the flanges D D, for the purpose of letting the seat down into the axle to prevent it from slipping sidewise, confining the spring every way by means of the improved seat. This seat will not require the straps to be as large as in ordinary cases, and will hold the spring much firmer.

By this improved spring-seat an immense deal of repairs and rattling of carriages will be saved.

In order to use the improved spring-seat on the forward axle, or one spring on the hind axle, one of the flanges D D and both flanges F F may or may not be left off, and be cast by bridging across from F F, leaving a hole in the seat for the perch to pass through under the flanges D D, the flanges being bolted firmly thereto, and the king-bolt made with a shoulder to rest against the bottom of the seat and extend up through the spring from E to E, and screwed firmly thereto, making a rocker of the seat.

To the hind axle with one spring the flanges F F may be left off, and the flanges D D may be brought down even with the axle and perch, one of them extended on and fastened thereto. If other fastenings are required for the springs on the forward axle, there may be grooves cut on the under side of the seat at F F, in keeping with the grooves C C C C, for straps, making a rocker and seat combined.

What we claim, and desire to secure by Letters Patent, is—

1. The four flanges B B B B, on the spring-seat A A, substantially as and for the purpose herein described.
2. The four grooves C C C C, substantially as and for the purpose herein described.
3. The bolting of the seat and spring together from E to E, and making a king-bolt of the same, substantially as and for the purpose herein described.

RUFUS ROWELL.
FRANCIS H. BRIGGS.

Witnesses:
OLIVER L. BRIGGS,
A. H. BRIGGS.